United States Patent Office 2,755,322
Patented July 17, 1956

---

2,755,322

PROCESS FOR PREPARING UNSATURATED ORGANIC COMPOUNDS

Frederick F. Rust, Orinda, and Lee M. Porter, Richmond Annex, Calif., assignors to Shell Development Company, Emeryville, Calif., a corporation of Delaware No Drawing. Application July 15, 1952, Serial No. 299,026

16 Claims. (Cl. 260—680)

This invention relates to a new process for preparing unsaturated organic compounds. More particularly, the invention relates to a process for preparing organic compounds substituted with allylic groups by pyrolyzing allylic halides in the presence of other organic compounds.

Specifically, the invention provides a new non-catalytic process for preparing organic compounds substituted with at least one allylic group which comprises pyrolyzing an allylic halide at a temperature above about 450° C. for a short period in the presence of an excess of an organic compound containing a replaceable hydrogen atom and then recovering the desired allylic-substituted organic compound from the resulting mixture.

As a special embodiment, the invention provides a new method for preparing polyolefins, such as diallyl, from allylic halides and monoolefins which comprises pyrolyzing the allylic halide at a temperature above about 450° C., and preferably between 450° C. and 650° C., for a few seconds, in the presence of an excess of the monoolefin and then recovering the desired polyolefin from the resulting mixture.

As a further embodiment, the invention provides a special process for preparing certain of the allylic-substituted organic compounds directly from a halogen and a beta, gamma-unsaturated compound containing a replaceable hydrogen atom. This is accomplished according to the present invention by reacting the halogen with a large excess of the beta, gamma-ethylenically unsaturated compound in the first part of the reaction zone under conditions which favor halogenation via substitution, and then pyrolyzing the resulting mixture in the latter part of the reaction zone at a temperature above about 450° C.

A great many methods for preparing organic compounds substituted with unsaturated groups, such as allylic groups, have been suggested in the past, but in general such methods have not proved entirely satisfactory, particularly for large scale operations. Many of these unsaturated compounds have been prepared, for example, by reacting an organic compound with an unsaturated halide in the presence of a metal, such as sodium. This method is generally undesirable as it involves the use of expensive reactants and in many cases gives low yield of product. Many of these compounds have also been prepared by dehydrohalogenating the corresponding halogen substituted derivatives. This method leaves much to be desired as the halogenated derivatives are in general difficult to prepare and special catalysts and reaction conditions are required for the dehydrohalogenation step.

It is an object of the invention, therefore, to provide a new and improved method for preparing organic compounds substituted with at least one allylic group. It is a further object to provide a new non-catalytic method for preparing organic compounds substituted with allylic groups from allylic halides and organic compounds containing a replaceable hydrogen atom. It is a further object to provide a practical and efficient method for coupling allylic radicals to other organic radicals. It is a further object to provide an efficient method for preparing polyolefins from allylic halides and monoolefins. It is a further object to provide a method for preparing polyolefins from allylic halides and monoolefins without the use of special catalysts. It is a further object to provide an efficient method for preparing diallyl from allyl chloride and propylene. It is a further object to provide a method for preparing allylic-substituted organic compounds directly from the halogen and a beta, gamma-ethylenically unsaturated compound by reacting the halogen with a large excess of the unsaturated compound under conditions which favor halogen substitution, and then pyrolyzing the resulting mixture. Other objects and advantages of the invention will be apparent from the following detailed description thereof.

It has now been discovered that these and other objects may be accomplished in part by pyrolyzing an allylic halide at a temperature above about 450° C. for a short period in the presence of an excess of an organic compound containing a replaceable hydrogen atom and then recovering the desired substituted organic compound from the resulting mixture.

The process of the invention is based on the unexpected discovery that allylic halides decompose at temperatures above about 450° C. to yield an allylic free radical and a halogen atom, and, if the pyrolysis is conducted in the presence of an excess of another organic compound containing at least one replaceable hydrogen atom, the halogen atom will abstract a hydrogen atom from that compound to yield a new free radical and that radical will associate with the allylic radical to form the desired substituted organic compound. The mechanism of this reaction may be illustrated by the following equations showing the production of diallyl from allyl chloride and propylene:

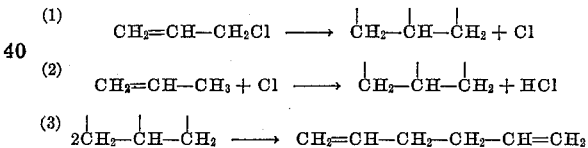

The allyl chloride yields an allyl free radical and a halogen atom, the halogen atom abstracts a hydrogen atom from propylene to yield a new allyl radical, and then two allyl radicals combine to form the desired diallyl.

The process of the invention is thus a general method for coupling allylic radicals to other organic radicals. By merely varying the type of allylic halide and the other organic compound, one can produce a great variety of different types of unsaturated compounds, many of which have never been produced heretofore. Thus, by employing an allylic halide and a monoolefin, one can produce non-conjugated polyolefins, and by employing an allylic halide and a saturated hydrocarbon such as butane, one can produce higher monoolefinic compounds.

The process of the invention represents a considerable improvement over the known methods for producing these compounds, and is particularly superior to the known methods for producing polyolefins, such as diallyl, as it avoids the use of special catalysts and difficult reaction conditions, permits the use of inexpensive reactants and in general permits a greater recovery of the desired product.

The expression "allylic halide" as used throughout the specification and claims refers to those organic compounds which possess a double bond between two aliphatic carbon atoms one of which is joined to an aliphatic carbon atom bearing a labile halogen atom. The halogen attached to the aliphatic carbon atom may be any of the halogens, such as chlorine and bromine, but is preferably chlorine. The allylic halides used in the process should, of course, be those which are incapable, under the high temperatures used in the present process, of splitting out hydrogen halide from one molecule of the said allylic halide to form conjugated double bonds. Examples of suitable allylic halides include allyl chloride, methallyl chloride, allyl bromide, 1,3-dichloropropene, methallyl chloride, methallyl bromide, 1-chloro-2,4,4-trimethyl-2-pentene, 1-chloro-3-phenyl-2-propene, 1-chloro-1-xylyl-2-propene and 1-chloro-3-chlorophenyl-2-propene.

Preferred allylic halides to be used in the process of the invention are those of the formula

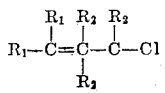

wherein $R_1$ is a member of the group consisting of hydrogen, chlorine, tertiary alkyl radicals, aryl and aralkyl radicals, and $R_2$ is a member of the group consisting of hydrogen, chlorine, alkyl, aryl and aralkyl radicals, such as allyl chloride, methallyl chloride, 1-chloro-3-phenyl-2-propene, 1-chloro-2,4,4-trimethyl-2-pentene, 1,3-dichloro-2-propene and 1,2,3-trichloro-2-propene.

Coming under special consideration particularly because of the ease of operation and high yields of product obtained therewith, are the allylic chlorides containing from 3 to 8 carbon atoms, such as allyl chloride and methallyl chloride.

The compounds to be used in the process of the invention in combination with the above-described unsaturated halides are those organic compounds having at least one replaceable hydrogen atom and are stable in the presence of the hydrogen chloride at the reaction temperature. Such compounds may be saturated or unsaturated, aliphatic, aromatic or heterocyclic. Included within this group are the olefins, such as ethylene, propylene, isobutylene, 2-hexene, 3-hexene, 2-octene and 3-decene; the saturated aliphatic hydrocarbons, such as propane, butane, hexane, octane and dodecane; cycloaliphatic hydrocarbons, such as cyclopentane, cyclohexane, cyclohexene, 2,4-dimethylcyclopentane; aromatics, such as xylene, toluene and the like.

These compounds may be used in the pure state or mixtures of one or more of them may be used. In the case of the hydrocarbons, for example, it may be desirable to use hydrocarbon fractions consisting of, or predominating in, hydrocarbons containing the same number of carbon atoms, such as propane-propylene cut, a butane-butylene-isobutylene cut, a pentane-pentene cut, etc.

The organic compounds containing a replaceable hydrogen atom which are preferably used for preparing the poly-unsaturated organic compounds are the ethylenically unsaturated aliphatic compounds containing from 2 to 12 carbon atoms, and more preferably the alkenes, the alkadienes, cycloalkenes and cycloalkadienes, such as propylene, isobutylene, octene, decene, methyl-cyclopentene, and mixtures thereof.

Especially preferred compounds for use in preparing the unconjugated polyolefins are the alkenes containing from 2 to 8 carbon atoms, such as propylene, isobutylene, hexene, octene and the like.

Organic compounds containing a replaceable hydrogen atom to be used in preparing the aromatic-substituted unsaturated compounds are preferably the alkyl-substituted aromatic compounds containing from 7 to 15 carbon atoms, and more preferably the alkaryl hydrocarbons containing from 7 to 12 carbon atoms, such as xylene, toluene, ethylbenzene, cumene, butylbenzene, and the like, and mixtures thereof.

Compounds to be used in preparing the mono-unsaturated organic compounds are preferably the saturated aliphatic hydrocarbons containing from 2 to 10 carbon atoms, and more preferably the saturated alkanes, and cycloalkanes containing from 2 to 6 carbon atoms, such as propane, butane, isobutane, cyclopentane and cyclohexane, and mixtures theerof.

Compounds described above which have proved to be particularly valuable in the process of the invention are those having replaceable hydrogen atoms having a bond energy of less than 90 kg. calories, and preferably less than 85 kg. calories. Also of special interest are those compounds that form free radicals that can be stabilized by resonance, such as propylene and isobutylene.

In the operation of the process of the invention, any one or more of the above-described unsaturated halides may be reacted with any or more of the above-described organic compounds containing the replaceable hydrogen atom. In case the organic compound is a hydrocarbon, it may be possible to add a hydrocarbon fraction containing the desired component.

The components may be premixed before they are added to the reaction zone or they may be added separately. If the components are added separately, one or both of the reactants may be added at a plurality of points throughout the reaction zone. To insure a thorough intimate mixing of the components, it is generally desirable, however, to premix the components before introducing them in the reaction zone. It is also advantageous in most instances to preheat the components, either separately or in admixture, to a temperature about 40° C. to 100° C. below the operating temperature before they are added to the reaction zone.

The components shoud be added so as to have the organic compound containing the replaceable hydrogen atom in excess of the halide and preferably in a molar excess of at least 3 to 1. For best results, the hydrogen-containing organic compound and unsaturated halide are combined in molar ratios varying from 12:1 to 4:1, and more preferably from 8:1 to 5:1. In general, higher ratios of the organic compounds containing the replaceable hydrogen atom give higher yields of product.

The temperature used in the reaction zone should be above about 450° C. and, in general, below about 750° C. The exact temperatures employed in each case are preferably adjusted to the nature of the unsaturated halide, residence period, etc. For the aliphatic unsaturated halides, such as allyl chloride, preferred temperatures generally range from about 450° C. to about 650° C. and more preferably from 540° C. to 600° C.

Atmospheric, superatmospheric or subatmospheric pressures may be used as desired. While the use of superatmospheric pressures may be desirable in some instances, the process is more conveniently executed at or near atmospheric pressure.

The residence period for the reaction will depend on the desired degree of decomposition of the unsaturated halide and this in turn will depend on the temperature selected and the nature of the unsaturated halide. The results are generally better when only an intermediate portion, say from 15% to 50%, and more preferably from 20% to 40%, of the unsaturated halide is decomposed per pass, and the conditions are generally adjusted to effect this type of conversion. At temperatures ranging from 450° C. to 750° C., the desired decomposition per pass is generally obtained in residence periods ranging from 1 second to 50 seconds. For the aliphatic halides, such as allyl chloride, at temperatures ranging from 450° C. to 550° C., the desired decomposition per pass is generally obtained in from 20 to 40 seconds, and at the higher temperatures, e. g. from 550° C. to 750° C., the desired decomposition is generally obtained in from 1 to 30 seconds.

The mixture withdrawn from the reaction zone is cooled, condensed and scrubbed or otherwise treated to remove the hydrogen chloride formed in the reaction zone. The desired unsaturated organic compound or compounds may then be recovered by any suitable means, such as fractional distillation, extraction, and the like. In addition to the desired organic compounds containing the substituted unsaturated radical, the reaction mixture may also contain quantities of the unsaturated halide, the organic compound containing the replaceable hydrogen atom, cyclic compounds, such as benzene, cyclohexadiene, naphthalene, and the like. These by-products may also be conveniently recovered by any of the conventional methods, such as distillation and the like.

As indicated above, the invention also provides as a special embodiment a novel method for preparing certain of the allylic-substituted organic compounds directly from a halogen and a beta,gamma-ethylenically unsaturated organic compound which contains a replaceable hydrogen atom and is capable of being converted via halogenation by substitution into an allylic halide. According to this process, the halogen and a large excess of the beta,-gamma-ethylenically unsaturated organic compound are reacted in the first part of the reaction zone under conditions which favor halogenation via substitution and the resulting mixture is then pyrolyzed in the latter part of the reaction zone to form the desired allylic-substituted compound. Diallyl may be prepared by this method, for example, by reacting a halogen and an excess of propylene in the first part of the reaction zone at a temperature below 450° C. which favors the formation of allyl chloride, and then pyrolyzing the resulting mixture containing allyl chloride and propylene in the latter part of the reaction zone at a temperature above about 450° C.

This special method is generally preferred over the above-described process of preparing the allylic-substituted compounds by starting with the allylic halides in that it utilizes the relatively inexpensive beta,gamma-ethylenically unsaturated compounds as the feed mixture in place of the allylic halides, and yields the more expensive allylic halides as a by-product.

The beta,gamma-ethylenically unsaturated organic compounds used in this special method may be any of those above-described organic compounds having the replaceable hydrogen atom, such as the olefins as propylene, isobutylene and the like. It is also possible to utilize mixtures containing the beta,gamma-ethylenically unsaturated compounds, such as propane-propylene cut, butane-butylene-isobutylene cut, and the like. Such mixtures preferably contain a predominant amount, and more preferably at least 70%, of the desired beta,gamma-ethylenically unsaturated compound. If the beta,gamma-ethylenically unsaturated compound is used by itself, the resulting allylic-substituted compound will have a symmetrical arrangement as it will be made up by the association of two of the beta,gamma-ethylenically unsaturated radicals. However, if mixtures containing the beta,gamma-ethylenically unsaturated compounds are employed, the resulting product may contain certain of the unsymmetrical allylic-substituted compounds such as may be derived by association of an allylic radical with a radical derived from one of the other components in the feed mixture.

According to this special process, the halogen and beta,-gamma-ethylenically unsaturated compound are combined in the first part of the reaction zone in a low halogen to beta,gamma-ethylenically unsaturated compound ratio and this mixture maintained under conditions which favor halogenation by substitution. In view of the high reaction velocity of free halogen with the unsaturated compounds, even at low temperatures, it is preferred to preheat at least one of the reactants, such as the beta,gamma-ethylenically unsaturated compound, before the components are combined. Heating of the reaction zone alone is not very effective because if the reagents are at a low temperature when they enter the zone they will have at least partly reacted via addition before they are heated to the desired temperature at which substitution is favored.

It is also desirable to make use of high velocity and of turbulent flow to prevent the occurrence of flame and its concomitant production of free carbon, and to make higher operating temperatures usable. The high velocity of flow of reaction mixture enables the reactants to enter at a speed in excess of the speed of flame propagation and the turbulent flow produces an intimate mixing which enables the reactants to become uniformly dispersed in each other before any considerable amount of halogenation takes place.

It is also possible to add inert diluents, such as nitrogen, to reduce carbonization.

In order to have an excess of the beta,gamma-ethylenically unsaturated compound available in the later stage of the process, the components should be combined initially so as to have a very large excess of that compound over the stoichiometric requirement for reaction with the available halogen. In most instances, the beta,gamma-ethylenically unsaturated compound and halogen are initially combined in the molar ratio of 10:1 to 4:1 and more preferably from 9:1 to 5:1.

The temperature employed in the first part of the reaction zone should be sufficient to promote halogenation by substitution while suppressing halogenation by addition. The temperature need for this purpose should be determined in each case by the nature of the olefin selected and the halogenating agent. With open or closed-chain unbranched aliphatic hydrocarbons, such as propylene, and the like, temperatures of the order of 300° C. to 500° C. are generally sufficient to promote substitution rather than addition. With unsaturated compounds wherein a double bond joins two carbon atoms one of which is linked to three carbon atoms, such as tertiary olefins, e. g., isobutylene and the like, the halogenation by substitution may usually be accomplished at slightly lower temperatures, such as of the order of 250° C. to 490° C.

The products of this phase of the reaction then pass into the other portion of the reaction zone where the formed unsaturated halide is pyrolyzed in the presence of the excess beta,gamma-unsaturated compound. The temperature employed in this portion of the reaction zone should be the same as those indicated above for the pyrolysis of the unsaturated halides. As indicated, pyrolzing temperatures varying from 450° C. to 750° C. are generally sufficient with preferred temperatures for the aliphatic allylic halides varying from 540° C. to 600° C.

The residence period for this preferred method of operation should only be slightly longer, e. g., from 2 to 10 seconds than that needed for the direct pyrolysis of the unsaturated halide in the presence of the olefin as described above. In most instances, the initial halogenation phase may vary from 0.5 second to 7 seconds, and the latter phase of pyrolyzing the formed unsaturated halide should vary generally from 1 to 30 seconds, and more preferably from 5 to 20 seconds.

The mixture withdrawn from the reaction zone is cooled, condensed and scrubbed or otherwise treated to remove the hydrogen chloride formed in the reaction. The desired unsaturated organic compound or compounds are then recovered by any suitable means, such as fractional distillation, extraction, and the like. In addition to the desired unsaturated compound or compounds and the by-products mentioned hereinabove, the reaction mixture in this case will also contain some of the unsaturated halide produced in the initial phase of the process.

The apparatus used in the above-described process for the pyrolysis of the unsaturated halide in the presence of the organic compound containing the replaceable hydrogen atom as well as the preferred method of preparing certain of the desired compounds by directly halogenating the mono-unsaturated compound, may be of any suitable construction as long as it provides means for introducing the reactants, means for maintaining the desired temperature and means for condensing the reaction mixture and recovering the desired product. The reaction tube should be fabricated from materials capable of withstanding vapors of the halogen acids and the high temperatures employed in the pyrolysis of the halides. Reaction tubes of glass, steel, etc., are especially suitable.

To illustrate the manner in which the invention may be carried out, the following examples are given. It is to be understood, however, that the examples are for the purpose of illustration and the invention is not to be regarded as limited to any of the specific conditions or reactants cited therein.

*Example I*

The apparatus used in this experiment comprised a cylindrical glass reaction tube having a thermal well down the center. The tube had a length of about 30 cm. and a volume of about 700 cc. Around the tube was an electrical furnace that contained separate heating units around the upper, middle and bottom portions of the tube. A small spiral preheat glass tube was joined to the top of the reaction tube and the bottom of the tube was joined to a water-cooled condenser which in turn was joined to a water trap for removing HCl and a dry ice trap for condensing the organic material.

Allyl chloride and propylene were mixed in a ratio of 1:6 and the mixture passed into the glass preheat tube which was maintained at about 400° C. The preheated mixture then passed into the glass reaction tube which was kept at a temperature of 540° C. The residence period in the reaction tube was 20 seconds. The effluent vapors were removed at the bottom, cooled, and the hydrogen chloride removed in the water trap. The organic material that was collected in the dry ice trap was distilled to remove propylene, allyl chloride and the desired diallyl and a fraction made up of cyclohexadiene and benzene. Analysis indicated that there had been a 30% conversion of the allyl chloride and a 52.5% yield of diallyl.

2-methyl-1,5-hexadiene may be prepared according to the above-described process by replacing the propylene with isobutylene.

*Example II*

This example illustrates the preparation of dimethallyl by pyrolyzing methallyl chloride in the presence of isobutylene. The apparatus used was the same as that described in Example I.

Methallyl chloride and isobutylene were combined in four separate runs under the conditions shown in the table below. In each case, the mixture of methallyl chloride and isobutylene was preheated at 400° C. and then passed into the glass reaction tube. The effluent vapors were removed at the bottom, cooled, and the hydrogen chloride removed in the water trap. The organic material that was collected in the dry ice trap was distilled to remove the desired dimethallyl. The results obtained in each case are shown in the following table:

| Temp., °C. | Residence Time, sec. | Methallyl Chloride Input, gm. | C₄H₈: Methallyl Chloride, mole ratio | Percent Conv. HCl | Dimethallyl Yield |
|---|---|---|---|---|---|
| 540 | 13.6 | 99.1 | 4.15:1 | 53.0 | 28.5 |
| 540 | 15.6 | 61.4 | 11.8:1 | 47.7 | 51.7 |
| 560 | 9.2 | 99.3 | 4.17:1 | 60.8 | 30.1 |
| 520 | 38.7 | 99.5 | 4.18:1 | 60.1 | 33.9 |

*Example III*

This example illustrates the preparation of 4-phenylbutene-1 by pyrolyzing allyl chloride in the presence of toluene. The apparatus used in this experiment is the same as that described in Example I.

Allyl chloride and toluene were mixed in a ratio of 1:4 and introduced into the glass preheat tube which was maintained at about 400° C. This mixture then passed into the glass reaction tube which was maintained at 560° C. The residence period was about 14.6 seconds. The effluent vapors were removed at the bottom, cooled, and the hydrogen chloride removed at the water trap. The organic material that was collected in the dry ice trap was distilled to recover the desired 4-phenylbutene-1. Other products recovered in small quantities include dibenzyl, stilbene and naphthalene.

*Example IV*

Using an apparatus shown in Example I, 1,3-dichloropropene and propylene were mixed in a ratio of 1:11 and this mixture passed into the glass preheat tube which was maintained at about 400° C. The mixture was then passed into the glass reaction tube which was kept at 540° C. The residence period was 26 seconds. The effluent vapors were removed at the bottom, cooled, and the hydrogen chloride removed at the water trap. The organic material that was collected in the dry ice trap was then distilled to recover cyclohexadiene. The 1-chloro-1,5-hexadiene originally formed in the reaction had been converted at the high temperature to the cyclohexadiene. Analysis indicated there had been a 44% conversion of the dichloropropene and a 43% yield of cyclohexadiene.

*Example V*

This example illustrates the preparation of diallyl from allyl bromide and propylene. The apparatus used in this experiment was the same as that described in Example I.

Allyl bromide and propylene were mixed in a ratio of 1:6 and passed through the glass preheat tube which was maintained at about 400° C. The preheated mixture then passed into the glass reaction tube which was maintained at 500° C. The residence period in the reaction tube was about 20 seconds. The effluent vapors were removed at the bottom, cooled, and the hydrogen bromide removed in the water trap. The organic material that was collected in the dry ice trap was then distilled to remove the desired diallyl.

*Example VI*

This example illustrates the preparation of 1-hexene by pyrolyzing allyl chloride in the presence of propane. The apparatus used in this experiment was the same as that described in Example I.

Allyl chloride and propane were mixed in a ratio of 4:1 and passed through the preheat tube as shown in the preceding example. The mixture was then passed into the glass reaction tube which was kept at 560° C. The residence period was 23 seconds. The effluent vapors were removed at the bottom, cooled, and the hydrogen chloride removed at the water trap. The collected organic material was then distilled to remove the desired 1-hexene. Analysis indicated there had been a 65% conversion of the allyl chloride.

Related compounds can be obtained by replacing the propane in the above-described process with equivalent amounts of each of the following: butane, hexane, cyclohexane and octane.

*Example VII*

This example illustrates the preparation of diallyl by the direct chlorination of propylene. The apparatus used in this experiment was the same as that shown in Example I with the exception that an additional preheat tube was installed at the top.

The propylene was heated in the first preheat tube to a temperature of about 460° C. and then mixed with chlorine and nitrogen in the second preheat tube and passed into the reaction zone. The feed mixture contained propylene, nitrogen and chlorine in the ratio of 9:3:1. The upper third of the reaction tube was maintained at a temperature of 480° C. and the bottom two-thirds maintained at a temperature of 560° C. The residence period was 25 seconds. The effluent vapors were removed at the bottom, cooled, and the hydrogen chloride removed at the water trap. The collected organic material was then distilled to remove the formed allyl chloride and the desired diallyl.

*Example VIII*

This example illustrates the preparation of dimethallyl by the direct chlorination of isobutylene. The apparatus used in this experiment is the same as that described in the preceding example.

The isobutylene is preheated in the first preheat tube to a temperature of about 300° C. and then mixed with chlorine and nitrogen in the second preheat tube and passed into the reaction zone. The feed mixture contains isobutylene, nitrogen and chlorine in the ratio of 12:3:1. The upper third of the reaction tube is maintained at 450° C. and the bottom two-thirds maintained at a temperature of 550° C. The residence period is about 25 seconds. The effluent vapors are removed at the bottom, cooled, and the hydrogen chloride removed at the water trap. The collected organic material is then distilled to remove the formed methallyl chloride and the desired dimethallyl.

We claim as our invention:

1. A process for preparing a hydrocarbon compound substituted with at least one allylic group, which comprises pyrolyzing an allylic halide which is incapable of splitting out hydrogen halide under the conditions of the process at a temperature above about 450° C. for a short period in the presence of an excess of a hydrocarbon containing at least one replaceable hydrogen atom, and then recovering the desired allylic substituted hydrocarbon from the reaction mixture, the allylic radical in the said recovered product still possessing its ethylenic group.

2. The process as defined in claim 1 wherein the temperature varies from 450° C. to 650° C. and the residence period varies from 1 to 30 seconds.

3. The process as defined in claim 1 wherein the unsaturated halide is an allylic halide containing from 3 to 8 carbon atoms.

4. The process as defined in claim 1 wherein the hydrocarbon containing a replaceable hydrogen atom has a hydrogen bond energy of less than 80 kg. calories.

5. A process for preparing a hydrocarbon compound substituted with an allylic group attached to carbon, which comprises heating a beta,gamma-monoolefinic aliphatic halide which is incapable of splitting out hydrogen halide under the conditions of the process to a pyrolyzing temperature between 450° C. and 650° C. for a short period in the presence of a hydrocarbon containing a replaceable hydrogen atom attached to carbon atom, the said halide and hydrocarbon containing the replaceable hydrogen atom being combined in a mole ratio of 1:4 to 1:12, and then recovering the desired allylic substituted hydrocarbon compound from the resulting mixture, the allylic radical in the said recovered product still possessing its ethylenic group.

6. A process for preparing a polyolefinic hydrocarbon compound having the same number of carbon atoms as the sum of the carbon atoms of the two reactants described hereinafter, which comprises heating an aliphatic beta,gamma-ethylenically unsaturated halide which is incapable of splitting out hydrogen halide under the conditions of the process at a pyrolyzing temperature above 450° C. for a short period in the presence of an excess of a monoolefinic hydrocarbon so as to produce a polyolefinic hydrocarbon compound, and then recovering the said polyolefinic hydrocarbon compound from the reaction mixture.

7. A process as defined in claim 6 wherein the unsaturated halide and the monoolefinic hydrocarbon are combined in a molar ratio of 1:4 to 1:12.

8. A process as defined in claim 6 wherein the temperature employed varies from 450° C. to 550° C. and the residence time is from 5 to 20 seconds.

9. A process as defined in claim 6 wherein the unsaturated halide is allyl chloride.

10. A process as in claim 5 wherein the hydrocarbon compound possessing the active hydrogen atom is one that forms free radicals that can be stabilized by resonance.

11. A process for preparing an ethylenically unsaturated hydrocarbon having a 2-alkenyl radical attached to a carbon atom of another hydrocarbon radical, which comprises heating a 2-alkenyl halide which is incapable of splitting out hydrogen halide under the conditions of the process at a pyrolyzing temperature between 450° C. and 650° C. for a brief period in the presence of a hydrocarbon having a replaceable hydrogen atom the bond energy of which is less than 90 kg. calories, the said halide and hydrocarbon being combined in the mole ratio of 1:4 to 1:8, and then recovering the desired 2-alkenyl substituted hydrocarbon from the resulting mixture, said 2-alkenyl radical in the desired product being derived from the 2-alkenyl halide.

12. A process as in claim 11 wherein the alkenyl halide is allyl chloride and the hydrocarbon is toluene.

13. A process as in claim 11 wherein the alkenyl halide is methallyl chloride and the hydrocarbon is isobutylene.

14. A process as in claim 11 wherein the alkenyl halide is allyl chloride and the hydrocarbon is propylene.

15. A process as in claim 11 wherein the alkenyl halide is allyl chloride and the hydrocarbon is propane.

16. A process for preparing diallyl which comprises heating allyl chloride in the presence of propylene in a molar ratio of 1:4 to 1:8 at a temperature between 500° C. and 600° C. for a residence period from 1 to 30 seconds, and then recovering diallyl from the resulting mixture.

References Cited in the file of this patent

UNITED STATES PATENTS

| | | |
|---|---|---|
| 2,387,723 | Dreyfus | Oct. 30, 1945 |
| 2,663,724 | Pines et al. | Dec. 22, 1953 |

FOREIGN PATENTS

| | | |
|---|---|---|
| 845,599 | France | May 15, 1939 |

OTHER REFERENCES

Grishkevich et al.: J. Russ. Phys. Chem. Soc., vol. 40, pages 1685–91.) (Abstracted in Chem. Abstracts, col. 3, page 1760 (1909).)

Henne et al.: Jour. Am. Chem. Soc., vol. 66, pages 392–394, March 1944.